(12) United States Patent
Nuernberger et al.

(10) Patent No.: US 11,951,871 B2
(45) Date of Patent: Apr. 9, 2024

(54) MULTI-VOLTAGE STORAGE SYSTEM FOR AN AT LEAST PARTLY ELECTRICALLY DRIVEN VEHICLE

(71) Applicant: Bayerische Motoren Werke Aktiengesellschaft, Munich (DE)

(72) Inventors: Simon Nuernberger, Bad Aibling (DE); Werner Seliger, Hallbergmoos (DE); Boris Zuev, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 183 days.

(21) Appl. No.: 17/597,399

(22) PCT Filed: Jul. 6, 2020

(86) PCT No.: PCT/EP2020/068972
§ 371 (c)(1),
(2) Date: Jan. 5, 2022

(87) PCT Pub. No.: WO2021/023451
PCT Pub. Date: Feb. 11, 2021

(65) Prior Publication Data
US 2022/0314836 A1  Oct. 6, 2022

(30) Foreign Application Priority Data
Aug. 7, 2019  (DE) .................... 10 2019 121 277.4

(51) Int. Cl.
*B60L 58/19* (2019.01)
*B60L 1/02* (2006.01)
(Continued)

(52) U.S. Cl.
CPC ............. *B60L 58/19* (2019.02); *B60L 1/02* (2013.01); *B60L 58/22* (2019.02); *B60L 58/27* (2019.02);
(Continued)

(58) Field of Classification Search
CPC .......... B60L 58/19; B60L 58/27; B60L 58/22; B60L 1/02; H01M 10/615; H01M 10/625;
(Continued)

(56) References Cited

U.S. PATENT DOCUMENTS

| 5,847,520 A | 12/1998 | Theurillat et al. |
| 2010/0089547 A1 | 4/2010 | King et al. |

(Continued)

FOREIGN PATENT DOCUMENTS

| CN | 105356007 A | 2/2016 |
| CN | 107074125 A | 8/2017 |

(Continued)

OTHER PUBLICATIONS

Chinese-language Office Action issued in Chinese Application No. 202080039835.1 dated May 17, 2023 with English translation (18 pages).

(Continued)

*Primary Examiner* — Carlos Amaya
(74) *Attorney, Agent, or Firm* — Crowell & Moring LLP

(57) ABSTRACT

A multi-voltage storage system for an at least partly electrically driven vehicle includes a first storage module and a second storage module having an identical rated voltage for storing electrical energy, wherein on-board consumers are connected to the second storage module at least with priority during a charging process, a heating apparatus for heating the storage modules, a switch unit which is designed to connect the first storage module and the second storage module in series for a charging process and in parallel for driving the vehicle, and a control unit, which is firstly designed to control the switch unit before and/or during a charging process such that the parallel connection of the first storage module and the second storage module is eliminated, and which is secondly designed, after elimination of the (Continued)

parallel connection, to activate the heating apparatus before and/or during the charging process.

5 Claims, 3 Drawing Sheets

(51) Int. Cl.
| | | |
|---|---|---|
| B60L 58/22 | (2019.01) | |
| B60L 58/27 | (2019.01) | |
| H01M 10/44 | (2006.01) | |
| H01M 10/615 | (2014.01) | |
| H01M 10/625 | (2014.01) | |
| H01M 10/63 | (2014.01) | |
| H01M 10/657 | (2014.01) | |
| H01M 50/204 | (2021.01) | |
| H01M 50/249 | (2021.01) | |
| H01M 50/269 | (2021.01) | |

(52) U.S. Cl.
CPC ....... *H01M 10/441* (2013.01); *H01M 10/615* (2015.04); *H01M 10/625* (2015.04); *H01M 10/63* (2015.04); *H01M 10/657* (2015.04); *H01M 50/204* (2021.01); *H01M 50/249* (2021.01); *H01M 50/269* (2021.01); *H01M 2220/20* (2013.01)

(58) Field of Classification Search
CPC .. H01M 10/63; H01M 10/657; H01M 50/249; H01M 50/269; H01M 50/204; H01M 10/441; H01M 2220/20
See application file for complete search history.

(56) References Cited

U.S. PATENT DOCUMENTS

| | | | | |
|---|---|---|---|---|
| 2012/0007557 A1* | 1/2012 | Hayashigawa | ..... | H01M 8/0297 320/117 |
| 2017/0305289 A1 | 10/2017 | Meitinger et al. | | |
| 2018/0264968 A1 | 9/2018 | Molina et al. | | |
| 2018/0342881 A1 | 11/2018 | Schmitz et al. | | |
| 2019/0061551 A1 | 2/2019 | Knobel et al. | | |
| 2019/0299811 A1 | 10/2019 | Bryngelsson et al. | | |
| 2021/0075073 A1 | 3/2021 | Hou et al. | | |

FOREIGN PATENT DOCUMENTS

| | | |
|---|---|---|
| CN | 108136928 A | 6/2018 |
| CN | 108352717 A | 7/2018 |
| CN | 108736107 A | 11/2018 |
| CN | 109070761 A | 12/2018 |
| CN | 110035921 A | 7/2019 |
| DE | 10 2015 214 732 A1 | 2/2017 |
| DE | 20 2016 105 015 U1 | 4/2017 |
| DE | 10 2016 201 520 A1 | 8/2017 |
| DE | 10 2016 207 272 A1 | 11/2017 |
| DE | 10 2017 218 067 A1 | 4/2019 |
| DE | 10 2018 209 446 A1 | 12/2019 |
| WO | WO 2019/082778 A1 | 5/2019 |

OTHER PUBLICATIONS

International Search Report (PCT/ISA/210) issued in PCT Application No. PCT/EP2020/068972 dated Oct. 23, 2020 with English translation (four (4) pages).
German-language Written Opinion (PCT/ISA/237) issued in PCT Application No. PCT/EP2020/068972 dated Oct. 23, 2020 (seven (7) pages).
German-language Search Report issued in German Application No. 10 2019 121 277.4 dated May 18, 2020 with partial English translation (11 pages).
Chinese-language Office Action issued in Chinese Application No. 202080039835.1 dated Nov. 29, 2023 with English translation (13 pages).
Chinese-language Office Action issued in Chinese Application No. 202080039835.1 dated Aug. 22, 2023 with English translation (19 pages).

* cited by examiner

MULTI-VOLTAGE STORAGE SYSTEM FOR AN AT LEAST PARTLY ELECTRICALLY DRIVEN VEHICLE

BACKGROUND AND SUMMARY OF THE INVENTION

The invention relates to a multi-voltage storage system for an at least partially electrically driven vehicle. The invention relates in particular to a storage system that is able to be charged with relatively high charging powers.

In the case of electrically driven vehicles, for example in the case of PHEV vehicles (plug-in hybrid electric vehicles) or in the case of purely electrically operated vehicles (BEV, battery electric vehicles), an energy storage unit composed of one or more individual battery cells or storage cells currently serves as energy source. The battery cells are usually individual lithium-ion cells. These are connected to one another in series or in a combination of series and parallel circuits. The sum of the battery cells in this case defines the available energy and thus the range of an electrically driven vehicle.

Such an energy storage unit is typically charged through connection to an external charging station that is connected to an energy supply grid. The available connection power (charging power) for charging the energy storage unit may in this case be dependent on the charging station. Charging by way of DC current may be referred to as fast charging, with a charging power of 50 kW or more. Charging using AC current allows charging powers in the range of 3.6 kW up to 22 kW.

High charging powers are advantageous in order to avoid long downtimes of a vehicle for recharging the energy storage unit. One possibility for increasing the charging power is DC charging with an increased charging voltage (of for example 800 V or more, instead of 460 V or less at present).

The use of a higher charging voltage however requires changes to be made to the HV (high-voltage) storage technology that is used. In this case, the use of energy storage units having correspondingly increased rated voltages is usually undesirable (for example due to the bipolar transistors used in the inverter of the drivetrain, having insulated gate electrodes that are able to be used only up to particular maximum limit voltages).

Reference is made for example to DE 10 2017 218 067 A1 as further technical background. This discloses for example the use of two energy storage units for a vehicle having a changeover matrix that is used to connect the energy storage units in parallel or in series, such that the voltage of an energy storage unit doubles in the case of a series connection. In a driving mode, it is thus possible to use an unchanged driving voltage (for example of 400 V) and, in a charging mode, it is possible to use an increased charging voltage (for example of 800 V). DE 10 2017 218 067 A1 in this case deals in particular with providing a switchable storage system that is able to be changed over between a charging mode and a driving mode in a reliable and energy-efficient manner.

As yet unpublished DE 10 2018 209 446 from the applicant furthermore discloses a method for controlling the temperature of an electrical energy storage unit. The electric power that is able to be provided by an electrical energy storage unit is typically dependent on the temperature of the energy storage unit. In particular at low temperatures (for example in winter), the performance of an electrical energy storage unit may be significantly reduced, as a result of which the performance of the drive of a vehicle may be impaired. The electrical energy storage unit of a vehicle may therefore have a heating unit that is able to heat the electrical energy storage unit in order to increase the temperature of the electrical energy storage unit and thus the performance of the energy storage unit, in particular in winter. The heating unit is typically operated using electrical energy from the energy storage unit. This electrical energy is no longer available to operate the drive machine of the vehicle, meaning that the range of the vehicle is reduced by controlling the temperature of the energy storage unit.

The present invention is based on the technical object of increasing the range of an at least partially electrically driven vehicle having more than one energy storage unit.

This object is achieved by the claimed invention.

The invention is based on the following observations:

The starting point is the use, known per se, of a change-over matrix, by way of which for example two 400 V batteries are able to be connected in series to form an 800 V battery in the fast charging case. Another starting point is the use, known per se, of a direct or indirect energy storage unit heating system for controlling the temperature of an energy storage unit, for example a heating system internal to a cell, a cell intermediate heating system or an electric motor trimming system that is supplied with electricity from the energy storage unit itself. By way of example, extreme heating rates of 0.2-1 K/s may be achieved by integrating a heating foil in the cells or on the cell housing.

The inventors were confronted with the following problem: when changing over from two 400 V energy storage units in the form of two "battery packs" to an 800 V battery pack, the on-board power system consumers (such as for example the air-conditioning compressor or the passenger compartment heating system) usually remain connected only to a 400 V energy storage unit or battery pack, since all on-board power system components operate at 400 V. In the series connection of the two 400 V battery packs, this leads to a situation, at the end of the fast charging process, whereby the one 400 V battery pack that supplies the on-board power system consumers has a lower state of charge in comparison with the other 400 V battery pack. Prior to the parallel connection of the two series-connected 400 V battery packs following the charging process, the states of charge have to be equalized. In an internal procedure tested previously, an active energy loss was typically incorporated at the energy storage unit or battery pack with the higher state of charge for this purpose until an almost identical state of charge or an almost identical rated voltage was achieved. Only then was a parallel connection for subsequent vehicle operation able to be made.

The basic concept of the invention is the targeted use of an energy storage unit heating system before or during the fast charging to equalize state of charge differences following the fast charging process. It is additionally advantageous to heat the cells before or during the fast charging, in particular in the case of relatively low temperatures (for instance<) 25° in order to achieve short charging times.

Details of the basic observations: according to embodiments of the invention, before the fast charging process and/or during the fast charging process, the expected energy demand of the on-board power system consumers during the fast charging process is ascertained. The two parallel-connected energy storage units, for example two 400 V battery packs, are isolated and connected in series. The energy storage unit that will require no or less energy demand from the on-board power system consumers delivers the energy supply for activating the energy storage unit heating system (hereinafter also referred to as heating device) for both energy storage units; that is to say for example, in the case of using a cell heating system as energy storage unit heating system, that all of the cells of both battery packs are heated, but heating system is supplied with electricity from only one battery pack. This has the effect that the temperature of the cells is advantageously already controlled beforehand for the fast charging. A target temperature of for instance 20 to 35° C. is preferably striven for in this case. The "heating" battery pack or energy storage unit then already has the lower state of charge—preferably before the fast charging—for example −3%, that it had to produce by "wasting energy" in the earlier internal procedure immediately after charging in order to equalize the voltage. The fast charging is performed after the battery packs have been connected in series. During the fast charging, the energy already determined in advance for the on-board power system consumers is drawn from the non-heating battery pack or energy storage unit, this corresponding roughly to the energy that was being drawn beforehand from the heating battery pack, that is to say for example −3% SOC. At the end of the fast charging, both packs have the same state of charge and may be connected directly in parallel to give 400 V.

Embodiments of the invention therefore reduce the charging time and increases the state of charge at the end of the fast charging, since it is no longer necessary to perform discharging following the fast charging. The driver thus has more range available following the fast charging, and also a shorter charging time.

According to embodiments of the invention, a description is thus given of a storage system and a method for operating an at least partially electrically operated vehicle having more than one energy storage unit, in particular having two electrical energy storage units.

Embodiments of the invention may preferably comprise a power forecast for an upcoming time interval within a normal fast charging process (for example for a time interval of 10, 15, 20 minutes or longer). There may in this case be a prediction as to how each energy storage unit is at least partially discharged by consumers unilaterally or simultaneously during the fast charging in the upcoming time interval. Embodiments of the invention may furthermore comprise ascertaining an expected voltage difference between the two energy storage units at the end of fast charging.

According to one aspect of the invention, a description is given of a storage system for providing electric power for the drive of a vehicle. The electric power may in particular be used to operate one or more electric drive machines of a drive system of the vehicle.

The term "storage module" is hereinafter also used for the terms "battery pack" or "energy storage unit" used above.

The storage system according to an embodiment of the invention comprises a first and a second storage module for storing electrical energy. The storage system N may in general comprise storage modules for storing electrical energy, where N>1. Each storage module may in this case comprise at least one strand of typically multiple storage cells. The number N of storage modules is an integer and preferably an even number, where N>1. It may preferably be the case that N=2, giving an advantageous compromise between the charging voltage (for charging the storage system) and the driving voltage (for operating the drive system of the vehicle) (in particular with respect to the power transistors installed in the vehicle). The N storage modules may be of identical design (in particular with respect to the respective rated voltage and/or with respect to the respective storage capacity). The charging voltage may for instance be between 600 V and 1000 V. The driving voltage or the rated voltage of the storage modules may for instance be between 300 V and 500 V.

The storage system furthermore comprises a switching unit (having a plurality of controllable switches) that is designed to connect the N storage modules in series for a charging mode and to connect the N storage modules in parallel for the drive of the vehicle, that is to say to supply the drive system of the vehicle. The switching unit may furthermore be designed to couple the N storage modules in each case individually to the drive system of the vehicle or to decouple them from the drive system of the vehicle and/or to couple the N storage modules in each case individually to a charging station or to decouple them therefrom and/or to isolate the N storage modules from one another in order to operate them in each case individually with different on-board power system consumers.

The storage system furthermore comprises an electronic control unit that is designed to control the switching unit in accordance with its abovementioned switching functions. The control unit may be designed to actuate the switching unit such that, for a charging process, the series circuit consisting of the N storage modules is connected in parallel with a charging socket of the vehicle by way of which the storage system is able to be connected to an external charging station.

The control unit is furthermore designed to initiate at least one measure for determining in advance a difference between a state of charge (SOC) and/or a voltage of the first storage module and a state of charge and/or a voltage of the second storage module in preparation for a parallel connection of the first storage module and the second storage module and to reduce or at least almost equalize this difference until the end of the fast charging.

Reducing the difference between the states of charge or the voltages between the N storage modules makes it possible to achieve a safe changeover from a series circuit (for charging the storage modules) to a parallel circuit (for driving the vehicle).

The control unit is preferably designed, based on defined and acquirable information, to predictively ascertain that, following a charging process, the first (a first) storage module has a higher state of charge or a higher voltage than the second (a second) storage module, that is to say there is a state of charge or voltage difference.

The control unit is furthermore designed, in the event of a predicted state of charge or voltage difference at the end of fast charging, beforehand in preparation for the fast charging and/or during the fast charging, to actuate the switching unit such that the storage modules are isolated from one another and that, to heat both storage modules, roughly the same amount of energy is drawn from the first storage module, from which no on-board power system energy is drawn during the charging, as is drawn from the second storage module by the on-board power system consumers during the charging, so that the state of charge difference is roughly equalized at the end of the charging.

Details of the invention are explained with reference to an exemplary embodiment, in which N is chosen to be equal to 2 for simplification.

DETAILED DESCRIPTION OF THE DRAWINGS

Figure 1:
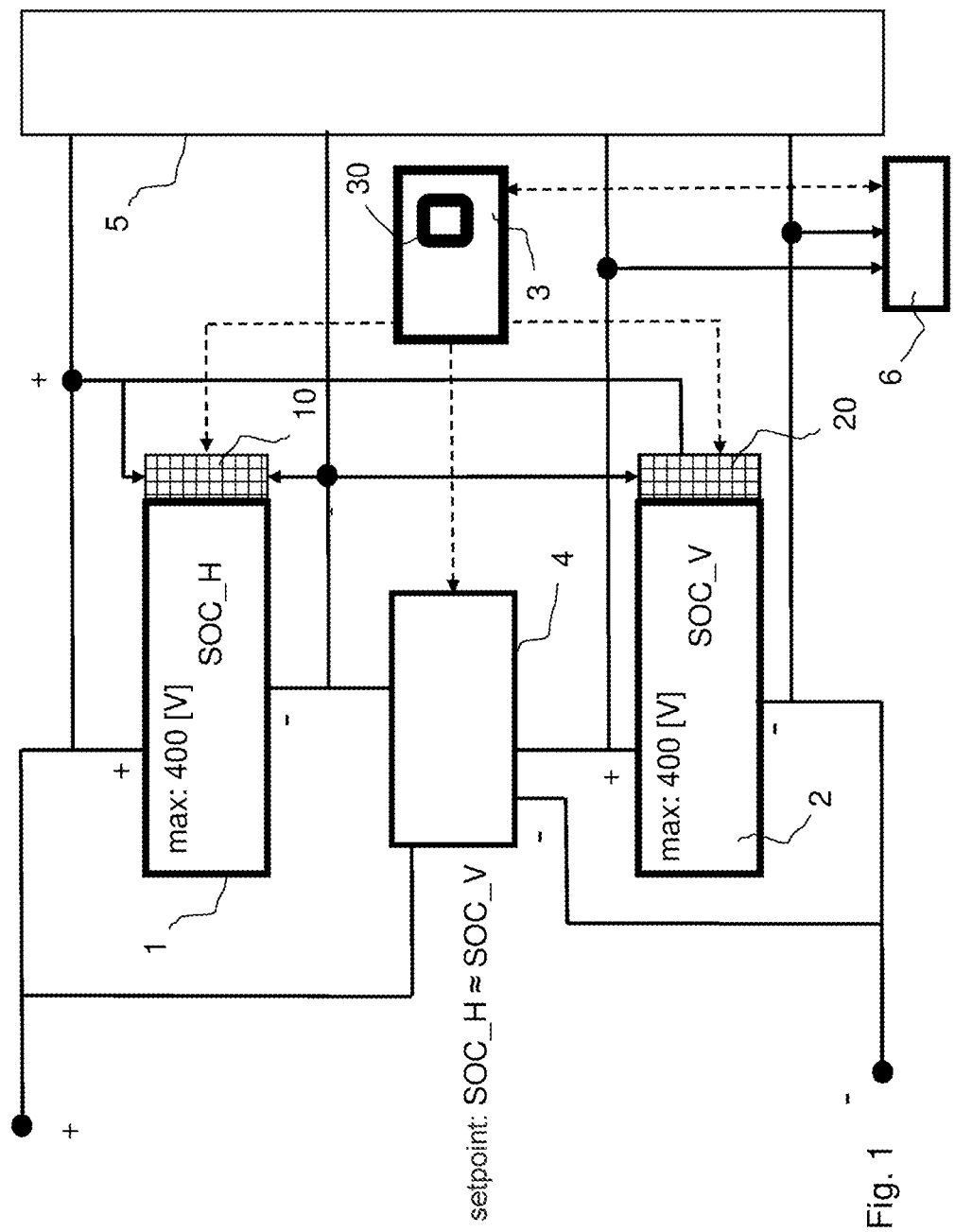
FIG. 1 shows the essential components of the system according to an embodiment of the invention in the case of decoupled storage modules.
Figure 2:
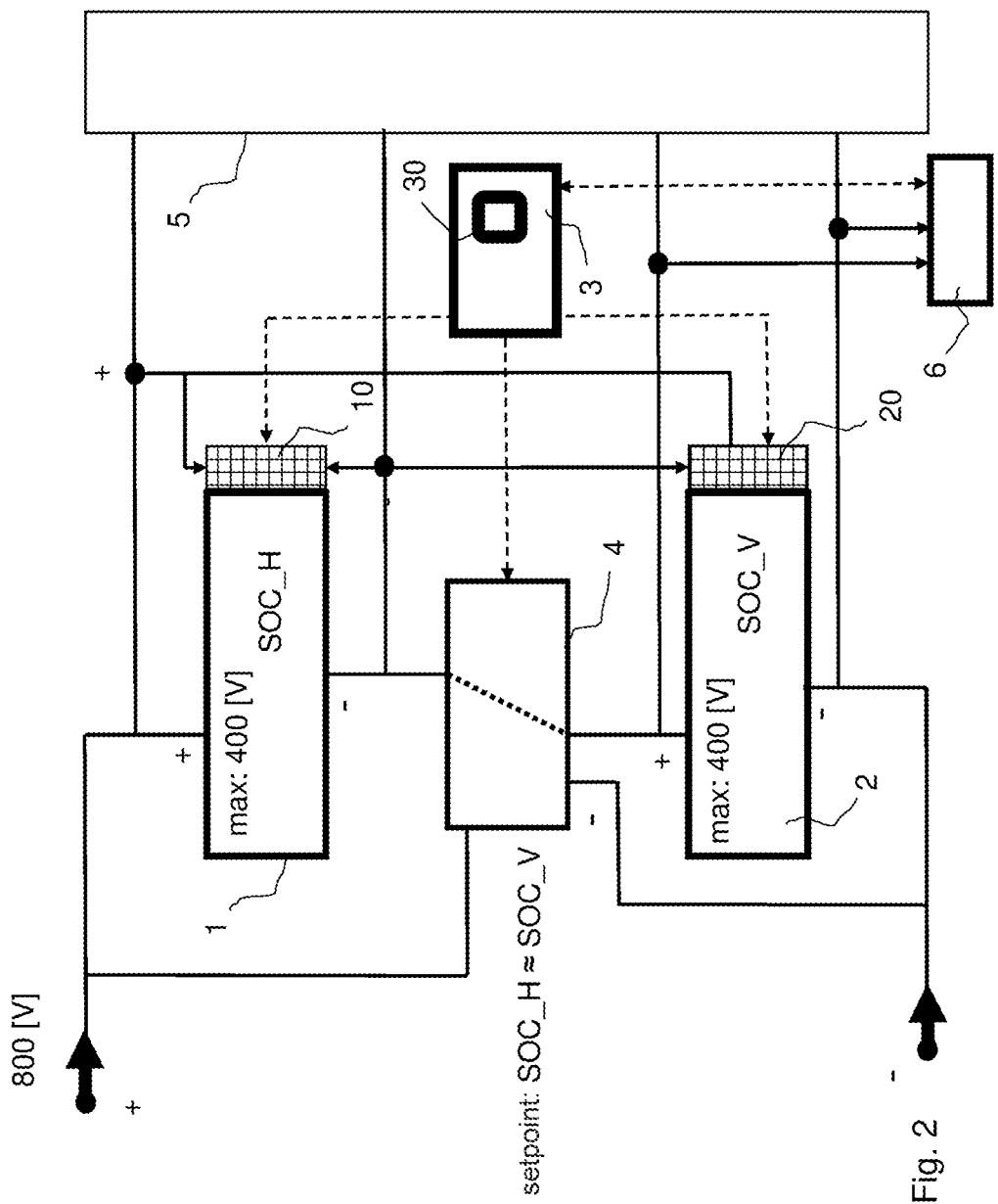
FIG. 2 shows the essential components of the system according to an embodiment of the invention in the case of series-connected storage modules for fast charging.
Figure 3:
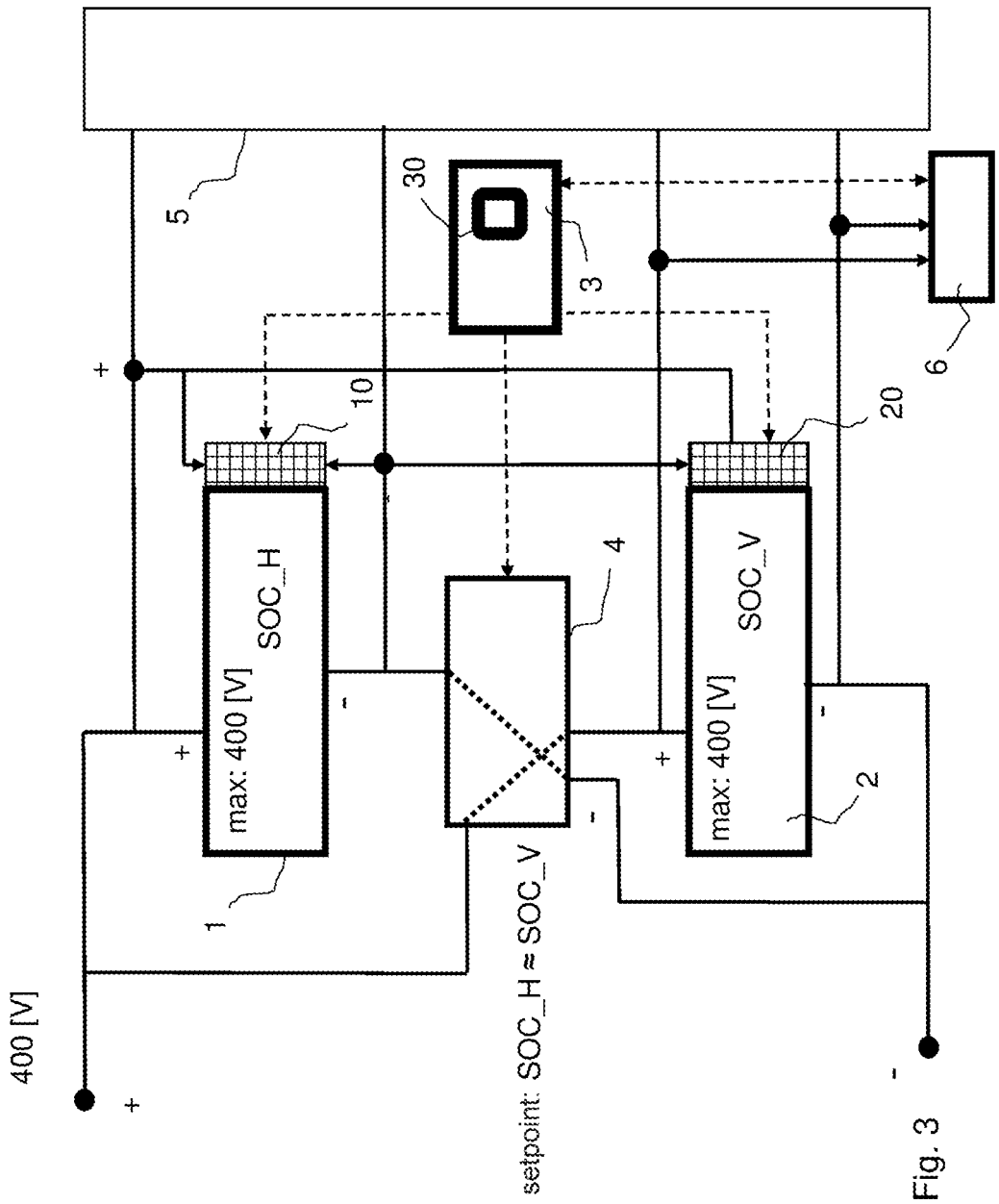
FIG. 3 shows the essential components of the system according to an embodiment of the invention in the case of parallel-connected storage modules for driving the vehicle.

FIGS. 1 to 3 schematically illustrate a vehicle having a two-voltage storage system and having an electric drive motor 5. Provision is made for a first storage module 1 and a second storage module 2 having an identical rated voltage (400 V) for storing electrical energy, wherein on-board power system consumers 6, such as in particular a heating and air-conditioning system, are connected at least primarily to the second storage module 2 during a charging process.

The storage modules 1 and 2 furthermore have a respective heating device 10 and 20 that are able to be actuated by an electronic control unit 3.

A switching unit 4 is designed to connect the first storage module 1 and the second storage module 2 in series for a charging process and to connect them in parallel for the drive of the vehicle.

The electronic control unit 3 is firstly designed to actuate the switching unit 4 before and/or during a charging process such that the parallel circuit of the first storage module 1 and of the second storage module 2 is broken.

The electronic control unit 3 is secondly designed to activate the heating devices 10 and 20 before and/or during the charging process after the parallel circuit has been broken, wherein the electrical energy demand for the heating devices 10 and 20 is drawn at least primarily from the first storage module 1.

The control unit 3 may in particular use an evaluation module 30 to determine in advance the expected electrical energy demand, during the charging process, of the on-board power system consumers 6, this being drawn at least primarily from the second storage module 2. To this end, the evaluation module 30 may for example take into consideration previously stored information about the duration of the next charging process and/or the current or expected switched-on state of on-board power system consumers 6.

The magnitude of the expected energy demand, determined in advance, that is drawn at least primarily from the second storage module 2 roughly defines the magnitude of the electrical energy demand to be expended for the heating devices 10 and 20, this being drawn at least primarily from the first storage module 1.

FIG. 1 shows a decoupled state of the storage modules 1 and 2 through the lack of a connection in the switching unit 4. The electrical energy demand for the heating devices 10 and 20 may be drawn from the first storage module 1 before a series connection or else during a series connection according to FIG. 2. FIG. 2 shows a series connection (here to give 800 V) for the fast charging of the storage modules 1 and 2.

During the fast charging, the energy already determined in advance for the on-board power system consumers is thus drawn from the non-heating storage module 2, this corresponding roughly to the energy that was being drawn before or at the same time from the heating storage module 1. At the end of the fast charging, the two storage modules 1 and 2 thereby have (roughly) the same state of charge (for example SOC=80%; SOC_H≈SOC_V) and may be connected back in parallel (here to give 400 V) immediately after the charging process for the drive 5 of the vehicle, as illustrated in FIG. 3 by the dashed lines in the switching unit 4.

What is claimed is:

1. A multi-voltage storage system for an at least partially electrically driven vehicle, the multi-voltage storage system comprising:
    a first storage module and a second storage module having an identical rated voltage for storing electrical energy, wherein on-board power system consumers are connected to the second storage module during a charging process,
    a heating device for heating the storage modules,
    a switching unit that is configured to connect the first storage module and the second storage module in series for the charging process and to connect them in parallel for driving the vehicle, and
    a control unit that is firstly configured to actuate the switching unit at least one of before or during the charging process such that a parallel circuit of the first storage module and of the second storage module is broken, and that is secondly configured to activate the heating device at least one of before or during the charging process after the parallel circuit has been broken, wherein an electrical energy demand for the heating device is drawn from the first storage module.

2. The multi-voltage storage system according to claim 1, wherein the control unit is further configured to:
    determine in advance an expected energy demand, during the charging process, of the on-board power system consumers, wherein the expected energy demand is drawn from the second storage module, and
    equalize the electrical energy demand for the heating device that is drawn from the first storage module and the expected energy demand that is drawn from the second storage module.

3. A method for operating a multi-voltage storage system for an at least partially electrically driven vehicle, the method comprising:
    providing a first storage module and a second storage module having an identical rated voltage for storing electrical energy,
    connecting on-board power system consumers to the second storage module during a charging process,
    heating the storage modules by way of a heating device,
    providing a switching unit by way of which the first storage module and the second storage module are connected in series for the charging process and are connected in parallel for driving the vehicle,
    providing a control unit by way of which firstly the switching unit is actuated at least one of before or during the charging process such that a parallel circuit of the first storage module and of the second storage module is broken, and by way of which secondly the heating device is activated at least one before or during the charging process after the parallel circuit has been broken, and
    drawing an electrical energy demand for the heating device from the first storage module.

4. The method according to claim 3, further comprising:
    determining in advance an expected electrical energy demand, during the charging process, of the on-board power system consumers, wherein the expected energy demand is drawn from the second storage module, and
    equalizing the electrical energy demand for the heating device that is from the first storage module and the expected energy demand that is drawn from the second storage module.

5. An electric vehicle comprising the multi-voltage storage system according to claim 1.

\* \* \* \* \*